(12) United States Patent
Gielen et al.

(10) Patent No.: US 11,454,386 B2
(45) Date of Patent: Sep. 27, 2022

(54) PANEL MODULE AND METHOD FOR OBTAINING THE SAME

(71) Applicant: SIGNIFY HOLDING B.V., Eindhoven (NL)

(72) Inventors: Vincent Stefan David Gielen, Gastel (NL); Henricus Mathijs Maria Creemers, Eindhoven (NL); Rene Theodorus Wegh, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 2 days.

(21) Appl. No.: 16/618,877

(22) PCT Filed: Jun. 4, 2018

(86) PCT No.: PCT/EP2018/064600
§ 371 (c)(1),
(2) Date: Dec. 3, 2019

(87) PCT Pub. No.: WO2018/224432
PCT Pub. Date: Dec. 13, 2018

(65) Prior Publication Data
US 2021/0080099 A1    Mar. 18, 2021

(30) Foreign Application Priority Data

Jun. 6, 2017  (EP) .................................. 17174497

(51) Int. Cl.
*G02F 1/1333* (2006.01)
*F21V 33/00* (2006.01)
(Continued)

(52) U.S. Cl.
CPC ........ *F21V 33/0032* (2013.01); *A47G 1/0622* (2013.01); *B33Y 80/00* (2014.12);
(Continued)

(58) Field of Classification Search
CPC .. F21V 2200/20; F21V 23/006; F21V 23/007; F21V 23/008; F21V 23/0032;
(Continued)

(56) References Cited

U.S. PATENT DOCUMENTS 5,986,726 A * 11/1999 Murai ............... G02F 1/133308
349/59
2003/0117562 A1* 6/2003 Kim .................... G02F 1/13452
349/149
(Continued)

FOREIGN PATENT DOCUMENTS

CN         102102829 A      6/2011
CN     WO 2013159394      * 10/2013   ....... G02F 1/133308
(Continued)

*Primary Examiner* — Zheng Song
(74) *Attorney, Agent, or Firm* — Daniel J. Piotrowski (57) ABSTRACT

A panel module (100), comprising a first frame (110) arranged in a first plane (P), and at least one optical element (135) elongating along the first plane. The first frame is at least partially hollow and arranged to hold at least a peripheral portion of the at least one optical element. The panel module further comprises a lighting arrangement (130) comprising at least one light-emitting diode, wherein the lighting arrangement is arranged within the first frame and at an edge portion of the at least one optical element. The panel further comprises a driver unit (140) coupled to the lighting arrangement and configured to supply power thereto. The first frame comprises a first space (150) provided behind the at least one optical element in a direction (D) perpendicular to the first plane, wherein the driver unit is arranged within the first space.

11 Claims, 5 Drawing Sheets

(51) Int. Cl.
  *A47G 1/06* (2006.01)
  *B33Y 80/00* (2015.01)
  *F21Y 115/10* (2016.01)
  *G02F 1/13357* (2006.01)

(52) U.S. Cl.
  CPC ..... *F21Y 2115/10* (2016.08); *G02F 1/133328* (2021.01); *G02F 1/133615* (2013.01)

(58) Field of Classification Search
  CPC ............... F21Y 2115/10; G02B 6/0083; G02F 1/133328; G02F 1/133615
  See application file for complete search history.

(56) References Cited

U.S. PATENT DOCUMENTS

| | | | |
|---|---|---|---|
| 2009/0128732 A1* | 5/2009 | Hamada | G02B 6/0068 349/58 |
| 2010/0265722 A1 | 10/2010 | Sohn | |
| 2011/0149596 A1* | 6/2011 | Lv | G02B 6/0073 362/607 |
| 2011/0292315 A1* | 12/2011 | Bae | G02F 1/133308 349/58 |
| 2012/0236597 A1 | 9/2012 | Liao et al. | |
| 2012/0242929 A1 | 9/2012 | Ohyama | |
| 2012/0287367 A1* | 11/2012 | Zhang | G02F 1/133308 349/58 |
| 2013/0038211 A1 | 2/2013 | Kang | |
| 2014/0313780 A1* | 10/2014 | Myers | F21V 23/006 362/646 |
| 2015/0055026 A1* | 2/2015 | Ikuta | G02F 1/133524 348/791 |
| 2015/0205030 A1 | 7/2015 | Chen | |
| 2015/0226997 A1* | 8/2015 | Tomomasa | G02F 1/1336 348/794 |
| 2016/0320667 A1* | 11/2016 | Zhang | G02F 1/133602 |
| 2017/0299801 A1* | 10/2017 | Kim | G02B 6/009 |
| 2020/0292884 A1* | 9/2020 | Lee | G02F 1/133606 |

FOREIGN PATENT DOCUMENTS

| | | |
|---|---|---|
| CN | 105065990 A | 11/2015 |
| CN | 204922705 U | 12/2015 |
| CN | 205090233 U | 3/2016 |
| EP | 1617280 A2 | 1/2006 |
| EP | 2431793 A2 | 3/2012 |
| JP | 2006053528 A | 2/2006 |
| TW | 201530049 A | 8/2015 |
| WO | 2009157686 A2 | 12/2009 |
| WO | 2011070724 A1 | 6/2011 |

* cited by examiner

PANEL MODULE AND METHOD FOR OBTAINING THE SAME

CROSS-REFERENCE TO PRIOR APPLICATIONS

This application is the U.S. National Phase application under 35 U.S.C. § 371 of International Application No. PCT/EP2018/064600, filed on Jun. 4, 2018, which claims the benefit of European Patent Application No. 17174497.2, filed on Jun. 6, 2017. These applications are hereby incorporated by reference herein.

FIELD OF THE INVENTION

The present invention generally relates to the field of panels. More specifically, the present invention relates to edge-lit LED panels.

BACKGROUND OF THE INVENTION

The market for edge-lit panels is growing, and especially for panels using LEDs. The panels may disperse the light evenly and uniformly as is well known in the art for backlighting of displays (i.e., backlighting of liquid crystal displays for smart cell phone displays, GPS displays, tablet computer displays and the like). As the cost of LEDs and other components for creating LED panel systems has substantially decreased in recent times, the LED panels are also being used in many other applications.

However, LED panels found in the prior art often suffer from several drawbacks. Firstly, some LED panels suffer from an inferior arrangement of components provide for the panels, whereby these components may have a negative influence on the illumination properties of the panel. Moreover, the prior art panels may be relatively complicated to assemble and/or comprise many components, leading to a time- and/or cost-inefficient panel considering its assembly and/or construction.

Hence, alternative solutions are of interest, which are able to provide panels, e.g. for the use in lighting applications, which are relatively easy to assemble, which may comprise relatively few components and/or which may have superior illumination properties compared to the prior art.

SUMMARY OF THE INVENTION

The purpose of the present invention is to provide a panel module and a method for illumination purposes, wherein these panel modules have improved illumination properties, which are relatively easy to assemble and which may comprise relatively few components compared to panels according to the prior art.

This and other objectives are achieved by providing a panel module and a method having the features in the independent claims. Preferred embodiments are defined in the dependent claims.

Hence, according to a first aspect of the present invention, there is provided a panel module. The panel module comprises a first frame arranged in a first plane, and at least one optical element elongating along the first plane. The first frame is at least partially hollow and arranged to hold at least a peripheral portion of the at least one optical element. The panel module further comprises a lighting arrangement comprising at least one light-emitting diode, wherein the lighting arrangement is arranged within the first frame and at an edge portion of the at least one optical element. The panel further comprises a driver unit coupled to the lighting arrangement and configured to supply power thereto. The first frame comprises a first space provided behind the at least one optical element in a direction perpendicular to the first plane, wherein the driver unit is arranged within the first space.

According to a second aspect of the present invention, there is provided a method for obtaining a panel module. The method comprises the step of extruding a printing material into a first frame extending in a first plane, wherein the first frame is at least partially hollow and comprises a first space. The method further comprises the steps of providing a lighting arrangement comprising at least one light-emitting diode, and attaching the lighting arrangement to the first frame. The method further comprises the steps of providing a driver unit and coupling the driver unit to the lighting arrangement, wherein the driver unit is configured to supply power to the lighting arrangement. The method further comprises the steps of arranging the driver unit in the first space, providing at least one optical element and attaching the at least one optical element to the first frame, such that the lighting arrangement is arranged at an edge portion of the at least one optical element and the at least one optical element is arranged in front of the first space in a direction perpendicular to the first plane.

Thus, the present invention is based on the idea of providing a panel module for illumination purposes. The first frame of the panel module is designed to receive one or more optical elements which are configured to impact on light emitted from a lighting arrangement attached to the first frame. The frame comprises a first space which is provided behind the at least one optical element in a direction perpendicular to the longitudinal direction of the optical element(s). The driver unit, which is coupled to the lighting arrangement, is arranged within the first space. Hence, as the driver unit may be conveniently arranged within the first space of the first frame and behind the optical element(s), the illumination properties of the panel module may be enhanced compared to prior art arrangements. More specifically, in the panel module of the present invention wherein the driver unit is arranged behind the optical element(s) of the panel module, the risk of blocking the light from the lighting arrangement by the driver unit is reduced and/or minimized. In the prior art, it will be appreciated that the driver is usually arranged beside any optical element, leading to several deficiencies. For example, a consequence of arranging the driver unit beside (or at the edge of) optical elements may be that the (effective) area of the optical element through which light may be emitted becomes smaller, given a fixed area of the panel module. As yet another example, an arrangement of the driver unit beside (or at the edge of) optical elements requires a wider first frame, having the consequence of a decreased (effective) area of the optical element. In contrast, the panel module according to the present invention may provide a panel module with improved optical properties, as the driver unit of the lighting arrangement may be provided behind the optical element(s). For example, the panel module of the present invention may hereby be able to emit light in a close vicinity of the edge of the panel module, which is not feasible with solutions found in the prior art. Furthermore, by arranging the driver unit behind the optical element(s), the effective area of the optical elements through which light may be emitted by the lighting arrangement may be increased. Moreover, the panel module of the present invention is further advantageous in that the first frame may be made relatively thin in the direction of the first plane, thereby being cost-efficient with respect to material costs and/or being able to provide a larger (effective) area for the optical element(s) of the panel module.

The panel module of the present invention is further advantageous in that the first frame may hold many and/or all components of the panel module, such as optical components (reflector(s), light guide(s), diffuser(s), etc.), electronics (driver(s), RF (radio frequency) board(s), IR (infrared) board(s), etc.). Furthermore, as the panel module comprises relatively few components, it is easily assembled, also leading to an improved cost-efficiency.

It will be appreciated that the panel module of the present invention does not comprise any metal sheet at the back end portion of the panel module. Consequently, the panel module is RF-transparent, and components such as sensors and communication elements may be arranged at a back end portion of the panel module, leading to a more convenient arrangement of the components.

It will be appreciated that the mentioned advantages of the panel module of the first aspect of the present invention also hold for the method according to the second aspect of the present invention.

According to an embodiment of the present invention, the first space comprises a clip arrangement configured to hold the driver unit. By the term "clip arrangement", it is here meant substantially any kind of arrangement allowing for a "snap" connection of the driver unit. For example, the first frame may be produced in such a manner that the first space comprises elements such as (resilient) flanges, clips, or the like, configured for a releasable attachment of the driver unit. The present embodiment is advantageous in that the clip arrangement may lead to a convenient attachment of the driver unit within the first space of the first frame.

According to an embodiment of the present invention, the first frame comprises a plurality of segments configured to be assembled into the first frame, and at least one connecting element configured to connect two segments. By the term "segment", it is here meant substantially any frame member, part, portion, or the like, which may be assembled into the first frame, whereby two segments may be connected by one or more connecting elements. The present embodiment is advantageous in that the clip arrangement may lead to a convenient, intuitive and easy attachment of segments by means of the connecting elements, such that the first frame may be created.

According to an embodiment of the present invention, the plurality of segments is configured to be interconnected at the respective end portions of the segments, wherein each segment comprises a respective second space at an end portion of the segment, and wherein one connecting element is configured to be form fitted into the second spaces of two segments configured to be interconnected. Hence, when two segments are oriented to be interconnected, the respective and adjacently provided second spaces of the segments provide a convenient, form-fitting insertion of a connecting element.

According to an embodiment of the present invention, at least two of the plurality of segments are configured to be assembled with a 90° angle with respect to each other to form a L-shape, and wherein at least a portion of the at least one connecting element is correspondingly L-shaped and configured to be form fitted into the two segments. By the term "L-shape", it is hereby meant that the assembled segments and/or connecting elements have portions having an internal angle of 90° and wherein the portions may be (but are not required to be) equally long. For example, the first frame may have a rectangular (e.g. quadratic) shape, wherein four segments may be assembled into the first frame by means of four connecting elements. The present embodiment is advantageous in that the segments and connecting elements provide a convenient, intuitive and easy assembly of segments and connecting elements for constructing the first frame.

According to an embodiment of the present invention, the at least one connecting element comprises a first portion having an L-shape and configured to be form fitted into the two segments. The at least one connecting element further comprises a second portion comprising two flanges with a 90° angle with respect to each other to form a L-shape, wherein the second portion is configured to abut a respective outer portion of the two segments. The at least one connecting element further comprises a third portion provided between the first portion and the second portion, wherein the third portion comprises a slit having a predetermined width.

According to an embodiment of the present invention, the panel module comprises four segments configured to be assembled with a 90° angle with respect to each other to form a first frame having a rectangular shape.

According to an embodiment of the present invention, the at least one optical element comprises at least one element selected from the group comprising a diffusor, a light guide, and a reflector.

According to an embodiment of the present invention, the panel module further comprises a second frame attached to the first frame, wherein the at least one optical element is provided between the first frame and the second frame. The present embodiment is advantageous in that the first and second frames hereby may clamp the optical element(s), thereby ensuring a relatively stable and safe panel module.

According to an embodiment of the present invention, the lighting arrangement comprises at least one strip comprising a plurality of light-emitting diodes (e.g. a LED strip), and wherein the at least one strip is attached to the first frame. The present embodiment is advantageous in that the LED strip may be conveniently fitted and attached to the first frame. In case of a rectangular first frame, it will be appreciated that the LED strip may be attached to one or more of the four segments of the first frame. In a preferred embodiment, two separate LED strips are attached to two separate segments of the first frame of the panel module.

According to an embodiment of the present invention, the first frame has been extruded by a 3D-printing process. The present embodiment is advantageous in that the first frame may be efficiently and conveniently produced by a 3D-printing process, whereby printing material is deposited iteratively according to a predetermined scheme to produce the first frame (a more detailed description of 3D-printing processes is omitted, as the technique is known to the skilled person). The present embodiment is advantageous in that the employment of a 3D-printing process enables customization and/or flexibility regarding several aspects of the first frame, such as its dimensions, interface with a ceiling if attached thereto, provision for sensors, etc.

According to an embodiment of the present invention, the first frame is made of aluminum (Al). It will be appreciated that many panel frames in the prior art have an insufficient stiffness for an easy and convenient handling of the frame. Furthermore, frames provided in the prior art may also be unnecessarily heavy, as the frames may be formed to a have a relatively high thickness to increase the stiffness of the frame. In contrast, the first frame made of aluminum according to the present embodiment provides a relatively light and stiff frame which is highly suitable for use in panel modules.

According to an embodiment of the present invention, the at least one connecting element is made of plastic. The present embodiment is advantageous in that the connecting element(s) may be produced in an easy and cost-efficient manner.

Further objectives of, features of, and advantages with the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1A:
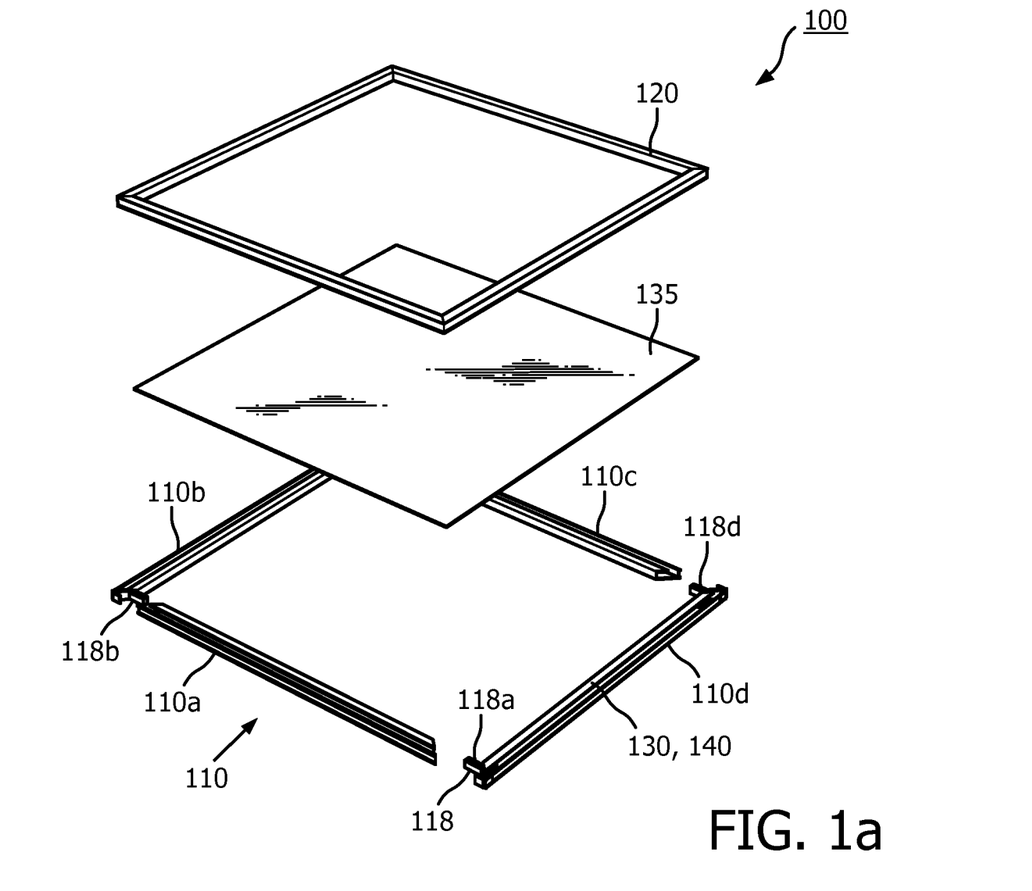
FIGS. 1a-c are schematic illustrations of a panel module according to exemplifying embodiments of the present invention.

FIG. 1a discloses an example of a panel module 100 according to the present invention. The panel module 100 comprises a first frame 110, which may be made of a lightweight metal, such as aluminum (Al). It will be appreciated that the first frame 110 may be extruded by a 3D-printing process.

The first frame 110 comprises four segments 110a-d which are configured to be assembled into the first frame 110. More specifically, the four segments 110a-d of the first frame 110 are configured to be assembled with a 90° angle with respect to each other, such that the assembled first frame 110 takes on a rectangular shape. The panel module 100 furthermore comprises at least one connecting element 118 configured to connect two adjacently provided segments 110. In this exemplifying embodiment, there are provided four connecting elements 118a-d (of which only connecting elements 118a,b,d are shown) which are L-shaped and configured to be form fitted into the segments 110a-d.

The panel module 100 further comprises a lighting arrangement 130 comprising at least one light-emitting diode, wherein the lighting arrangement 130 is provided within the first frame 110. In this example, the lighting arrangement 130 is provided in the segment 110d of the first frame 110, and the reference to the lighting arrangement 130 is therefore only schematically indicated. It will be appreciated that another, similar lighting arrangement may be provided in the oppositely arranged segment 110b of the segment 110d of the first frame 110.

The panel module 100 further comprises at least one optical element 135 which is attachable to the first frame 110. Although the optical element 135 is depicted as a (single) plate, it may comprise a stack of several, preferably plate-shaped, optical elements. For example, the optical element 135 may comprise one or more diffusors, light guides, reflectors, etc. The optical element(s) 135 is arranged at least partially in front of the lighting arrangement 130 in a direction of light emitted from the lighting arrangement 130.

The panel module 100 further comprises a driver unit 140. The driver unit 140 is coupled to the lighting arrangement 130 and configured to supply power to the lighting arrangement 130. In this example, the driver unit 140 is provided in the segment 110d of the first frame 110, and the reference to the driver unit 140 is therefore only schematically indicated.

Additionally, the panel module 100 may further comprise a second frame 120 attachable to the first frame 110, wherein the at least one optical element 135 is provided between the first frame 110 and the second frame 120.

Figure 1B:
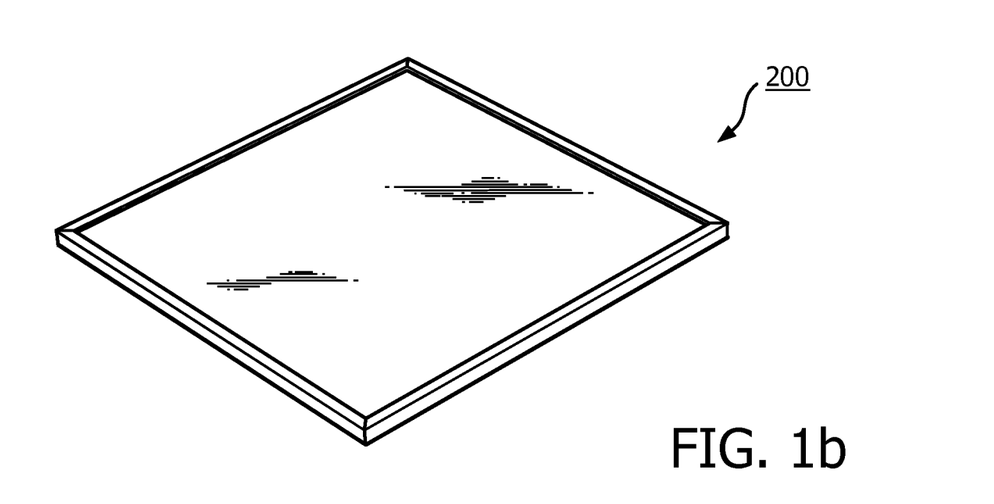

It will be appreciated that the panel module 100, as schematically shown in FIG. 1a, may be assembled into a resulting (and so called) edge-lit panel 200, schematically shown in FIG. 1b. It will be appreciated that light from the lighting arrangement of the panel module of the edge-lit panel 200 may be dispersed at least partially through the optical element(s) of the edge-lit panel 200.

Figure 1C:
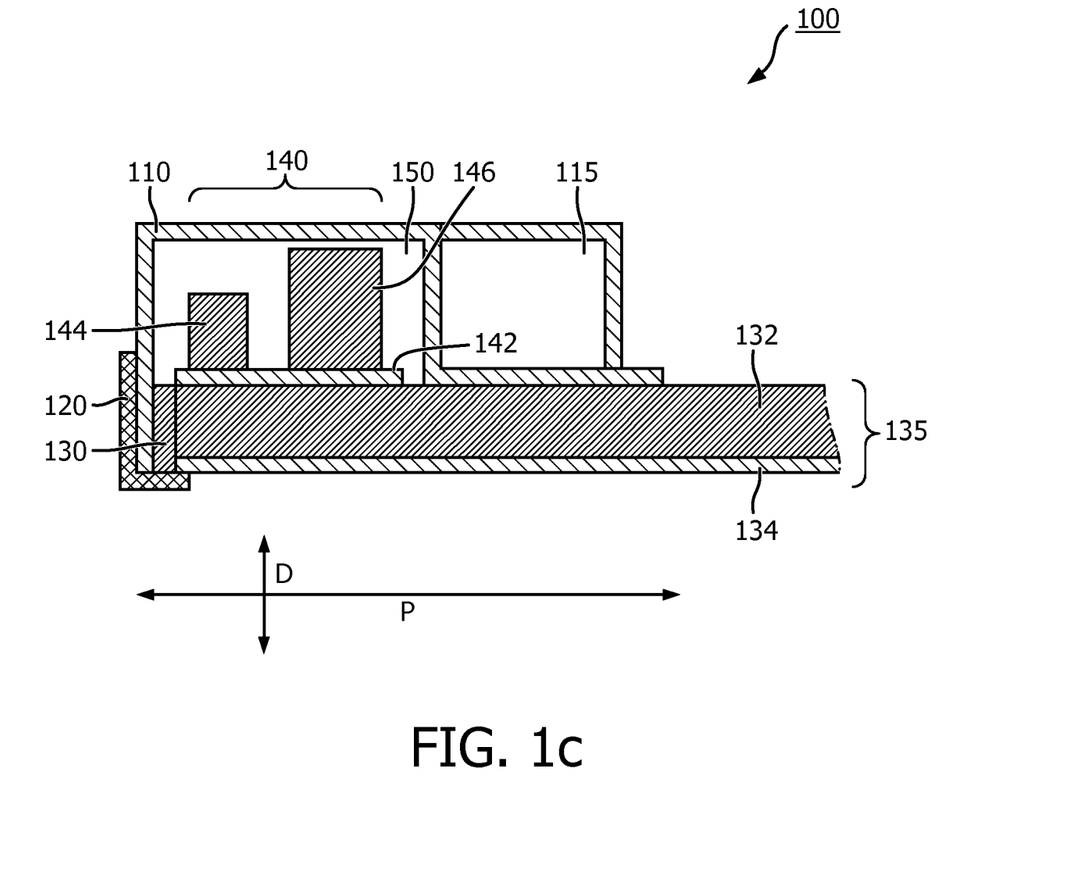

FIG. 1c schematically discloses a cross-section of a portion of the panel module 100. The first frame 110 of the panel module 100, wherein the first frame 110 may be rectangular (e.g. quadratic) according to previously described examples, is arranged in a first plane P. The first frame 110 comprises a first space 150, arranged in a direction (axis) D which is perpendicular to the plane P. A driver unit 140 is accommodated within the first space 150 and is coupled to a substrate 142, such as a printed circuit board (PCB). The driver unit 140 may comprise one or more components such as one or more capacitor(s) 144, transformer(s) 146, etc. It will be appreciated that the driver unit 140 in FIG. 1c is merely schematically indicated, and may comprise more or fewer components which furthermore may have a larger or smaller size than that of the shown components.

The panel module 100 further comprises at least one optical element 135 elongating along the first plane P. Hence, the optical element(s) 135 may be formed as a plate, sheet, panel, or the like. It will be appreciated that the first frame 110 is at least partially hollow and arranged to hold at least a peripheral portion of the at least one optical element (s) 135 attached to the first frame 110. The optical element(s) 135, which is configured to impact on the light from the lighting arrangement 130, may comprise a light guide plate (LGP) 132 and a diffusor 134 arranged in a stack. However, it will be appreciated that the optical element(s) 135 may comprise more and/or other optical elements, e.g. a reflector. For example, a reflector may be arranged on the back side of the LGP 132, opposite the diffusor 134.

The lighting arrangement 130, to which the driver unit 140 is coupled, is arranged at a side portion (edge) of the optical element(s) 135. The lighting arrangement 130 may comprise at least one strip comprising a plurality of light-emitting diodes (e.g. a LED strip). The LED strip may be arranged at one or more side portions of the optical elements(s) 135. For example, the LED strips may be arranged at oppositely arranged side portions of the optical element(s) 135. Furthermore, the LED strips may, for example, be attached to the first frame or the edge of the optical element(s) 135.

During operation of the panel module 100, light from the LEDs of the lighting arrangement 130 may be transmitted through the optical element(s) 135 and leave the panel module, either directly or through reflection. It will be appreciated that the lighting arrangement 130 may be coupled to a substrate, e.g. a PCB, although such a substrate is not shown in FIG. 1c.

Figure 2A:
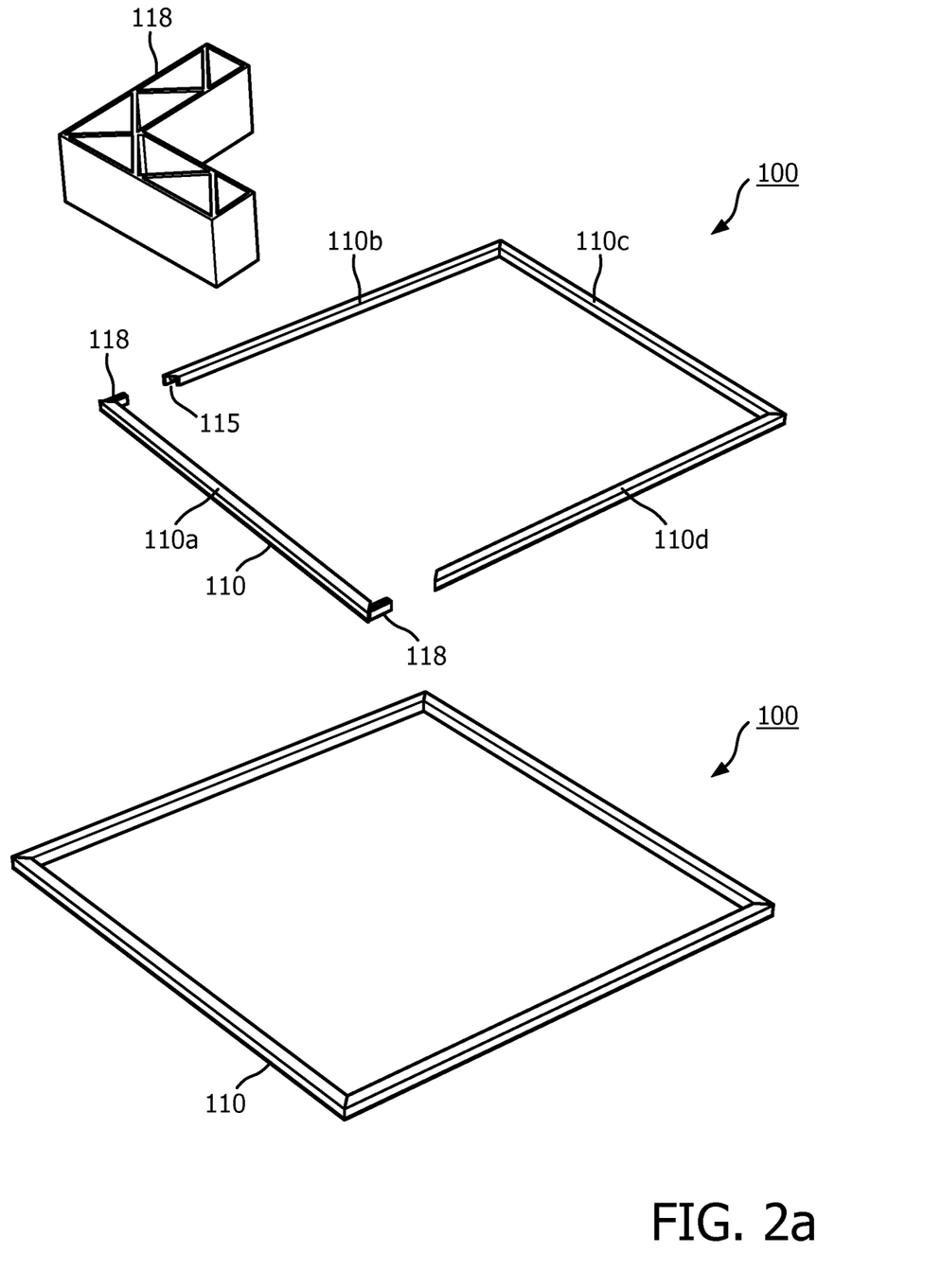
FIGS. 2a-b are schematic illustrations of configurations and assembling operations of panel modules according to exemplifying embodiments of the present invention.

The embodiment of FIG. 1c further shows that each segment 110a-d of the first frame 110 comprises a respective second space 115. This second space 115 may be a rectangular shaped box along the first space 150. This box-shaped structure is advantageous for improving the stiffness of the frame 100. The second space 115 may be hollow or solid, it may be rectangularly shaped, but other shapes improving the stiffness are allowed as well. The second space 115 may be elongated along the entire length of the segments 110a-d of the first frame 110, or they may be present only at the end portions of the segments 110a-d FIG. 2a is a schematic illustration of a portion of a panel module 100 according to an exemplifying embodiment of the present invention. The uppermost portion of the Figure indicates the assembly of a portion of a panel module 100, followed by an indication of a portion of the panel module 100 after the assembly. The first frame 110 comprises four segments 110a-d which are configured to be assembled into the first frame 110. It will be appreciated that the segments 110a-d comprise beveled edges of 45°, such that two adjacently arranged segments of the first frame 110 are configured to be assembled with a 90° angle with respect to each other. Consequently, the first frame 110 may be assembled into a rectangular shape. Each segment 110a-d comprises a respective second space 115 at an end portion of the segment 110a-d, and the segments 110a-d are hereby configured to be interconnected at their respective end portions by connecting elements 118. More specifically, a respective connecting element 118 is configured to be form fitted into the second spaces 115 of two segments of the first frame 110 configured to be interconnected (it will be appreciated that the connecting element 118 as shown is enlarged with respect to the first frame 110 for an increased understanding). According to this exemplifying embodiment, the connecting element 118 has an L-shape such that the two flanges of the L-shape may be form fitted into the respective second space 115 of adjacently provided segments. The connecting element 118 is preferably made of plastics. Furthermore, the structure of the connecting element 118 may be at least partially hollow with connecting bars.

The lowermost portion of the FIG. 2a indicates an assembled first frame 110 of the panel module 100 according to the method of assembly described above.

Figure 2B:
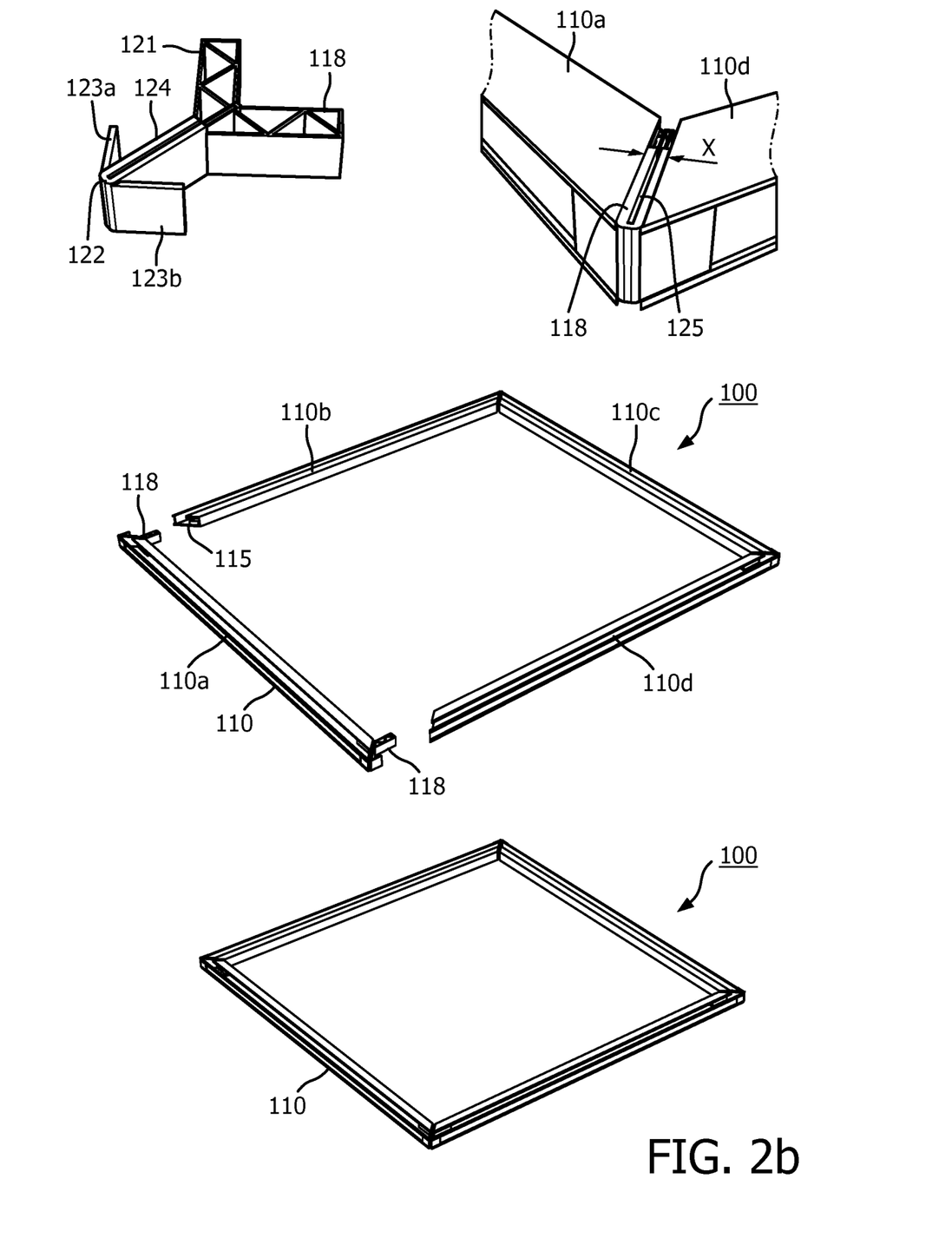

FIG. 2b is a schematic illustration of a portion of a panel module 110 according to an exemplifying embodiment of the present invention. Analogously with the first frame 110 as shown in FIG. 2a, the first frame 110 comprises four segments 110a-d which are configured to be assembled into the first frame 110. Two adjacently arranged segments of the first frame 110 are configured to be assembled with a 90° angle with respect to each other, and each segment 110a-d comprises a respective second space 115 at an end portion of the segment 110a-d for insertion of a connecting element 118. According to this exemplifying embodiment, the connecting element 118 comprises a first portion 121 having an L-shape configured to be form fitted into two segments to be connected. The connecting element 118 further comprises a second portion 122 comprising two flanges 123a,b with a 90° angle with respect to each other to form a L-shape of the second portion 122 arranged in parallel to the L-shape of the first portion 121. It will be appreciated that the segments of the first frame 110 are arranged to be provided between the first portion 121 and the second portion 122, such that the second portion 122 is configured to abut a respective outer portion of the two segments to be interconnected. Furthermore, the connecting element 118 comprises a third portion 124 provided between the first portion 121 and the second portion 122. The third portion 124 comprises a slit 125 having a predetermined width x, such that upon connection of two segments of the first frame 110, e.g. a connection of segments 110a and 110d as indicated in FIG. 2b, the third portion 124 allows for a separation of the two segments 110a and 110d. It will be appreciated that the slit 125 of the connecting element 118 hereby allows for signal (e.g. RF) reception through the slit 125. For an improved signal/radio reception, the gap 125 of the connecting element 118 may be tuned by increasing the width x.

The lowermost portion of the FIG. 2b indicates an assembled first frame 110 of the panel module 100 according to the method of assembly described above.

Figure 3:
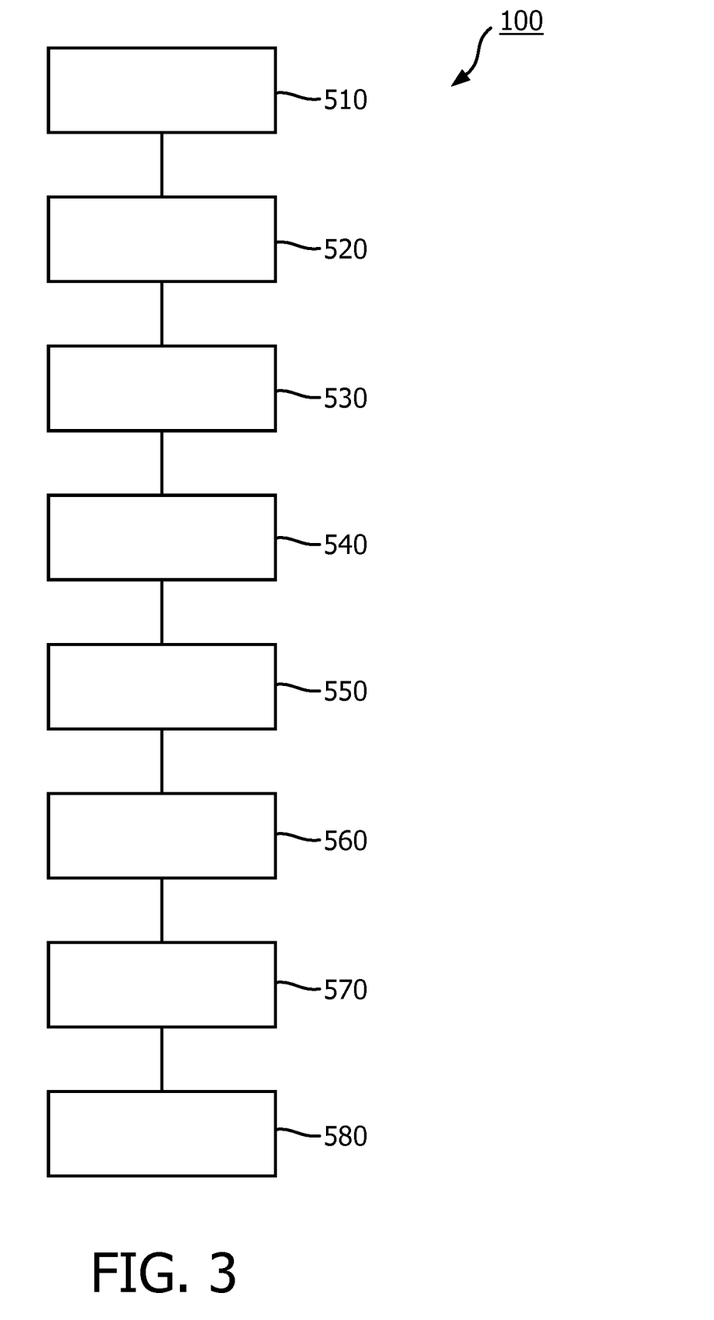
FIG. 3 is a schematic flow chart diagram of a method according to an exemplifying embodiment of the present invention.

FIG. 3 schematically shows a method 500 according to a second aspect of the present invention for obtaining a panel module. The method 500 comprises the steps of extruding 510 a printing material into a first frame, wherein the first frame is at least partially hollow and comprises a first space. It will be appreciated that the extruding 510 may be performed by a 3D-printing process. Furthermore, the method 500 comprises the steps of providing 520 a lighting arrangement comprising at least one light-emitting diode, and attaching 530 the lighting arrangement to the first frame. The method further comprises the steps of providing 540 a driver unit and coupling 550 the driver unit to the lighting arrangement, wherein the driver unit is configured to supply power to the lighting arrangement. The method further comprises the steps of arranging 560 the driver unit in the first space, providing 570 at least one optical element and attaching 580 the at least one optical element to the first frame, such that the lighting arrangement is arranged at an edge portion of the at least one optical element and the at least one optical element is arranged in front of the first space.

The person skilled in the art realizes that the present invention by no means is limited to the preferred embodiments described above. On the contrary, many modifications and variations are possible within the scope of the appended claims. For example, it will be appreciated that the figures are merely schematic views of a panel module 100 according to embodiments of the present invention. Hence, any elements/components of the panel module 100 such as the first frame 110, the optical element(s) 135, etc. may have different dimensions, shapes and/or sizes than those depicted and/or described.

The invention claimed is:

1. A panel module, comprising
 a first frame comprising a plurality of segments arranged in a first plane (P), and
 at least one optical element elongating along the first plane, wherein the first frame is at least partially hollow and arranged to hold at least a peripheral portion of the at least one optical element,
 wherein the panel module further comprises
 a lighting arrangement comprising at least one light-emitting diode, wherein the lighting arrangement is arranged within the first frame and at an edge portion of the at least one optical element, and
 a driver unit coupled to the lighting arrangement and configured to supply power thereto, said driver unit comprising an Light Emitting Diode (LED) driver circuit and an LED driver circuit substrate,
 wherein the first frame comprises a first space provided behind the at least one optical element in a direction (D) perpendicular to the first plane, wherein the driver unit is arranged within the first space fully behind the optical element such that an axis extending from each part of the driver unit in a direction perpendicular to the first plane will intersect with the optical element, and
wherein the plurality of segments are configured to be assembled into the first frame, and at least one connecting element configured to connect two segments, wherein the at least one connecting element comprises:
- a first portion having an L-shape and configured to be form fitted into the two segments,
- a second portion comprising two flanges with a 90° angle with respect to each other to form a L-shape, wherein the second portion is configured to abut a respective outer portion of the two segments, and
- a third portion provided between the first portion and the second portion, wherein the third portion comprises a slit having a predetermined width.

2. The panel module according to claim 1, wherein the plurality of segments is configured to be interconnected at the respective end portions of the segments, wherein each segment comprises a respective second space at an end portion of the segment, and wherein one connecting element is configured to be form fitted into the second spaces of two segments configured to be interconnected.

3. The panel module according to claim 2, wherein at least two of the plurality of segments are configured to be assembled with a 90° angle with respect to each other to form a L-shape, and wherein at least a portion of the at least one connecting element is correspondingly L-shaped and configured to be form fitted into the two segments.

4. The panel module according to claim 3, comprising four segments configured to be assembled with a 90° angle with respect to each other to form a first frame having a rectangular shape.

5. The panel module according to claim 1, wherein the at least one optical element comprises at least one element selected from the group comprising a diffusor, a light guide, and a reflector.

6. The panel module according to claim 5, further comprising a second frame attachable to the first frame, wherein the at least one optical element is provided between the first frame and the second frame.

7. The panel module according to claim 1, wherein the first space comprises a clip arrangement configured to hold the driver unit.

8. The panel module according to claim 1, wherein the lighting arrangement comprises at least one strip comprising a plurality of light-emitting diodes, and wherein the at least one strip is attachable to the first frame.

9. The panel module according to claim 1, wherein the first frame has been extruded by a 3D-printing process.

10. The panel module according to claim 1, wherein the first frame is made of aluminum, Al, and the at least one connecting element is made of plastic.

11. A method for obtaining a panel module, comprising the steps of:
- extruding a printing material into a first frame comprising a plurality of segments extending in a first plane (P), wherein the first frame is at least partially hollow and comprises a first space, and wherein the plurality of segments are configured to be assembled into the first frame by at least one connecting element for connecting two segments, said at least one connecting element comprises a first portion having an L-shape and configured to be form fitted into the two segments, a second portion comprising two flanges with a 90° angle with respect to each other to form a L-shape, wherein the second portion is configured to abut a respective outer portion of the two segments, and a third portion provided between the first portion and the second portion, wherein the third portion comprises a silt having a predetermined width,
- providing a lighting arrangement comprising at least one light-emitting diode, and attaching the lighting arrangement to the first frame,
- providing a driver unit and coupling the driver unit to the lighting arrangement, wherein the driver unit is configured to supply power to the lighting arrangement, and wherein said driver unit comprises an Light Emitting Diode (LED) driver circuit and an LED driver circuit substrate,
- providing at least one optical element and attaching the at least one optical element to the first frame, such that the lighting arrangement is arranged at an edge portion of the at least one optical element and the at least one optical element is arranged in front of the first space in a direction (D) perpendicular to the first plane, and
- arranging the driver unit in the first space fully behind the optical element such that an axis extending from each part of the driver unit in the direction (D) perpendicular to the first plane will intersect with the optical element.

* * * * *